US012307924B2

(12) United States Patent
Povilaitis

(10) Patent No.: US 12,307,924 B2
(45) Date of Patent: May 20, 2025

(54) TENSIONING FRAME FOR SHEET MEDIA

(71) Applicant: Darius A. Povilaitis, Chicago, IL (US)

(72) Inventor: Darius A. Povilaitis, Chicago, IL (US)

(73) Assignee: Darius Povilaitis, Chicago, IL (US)

( * ) Notice: Subject to any disclaimer, the term of this patent is extended or adjusted under 35 U.S.C. 154(b) by 187 days.

(21) Appl. No.: 18/124,714

(22) Filed: Mar. 22, 2023

(65) Prior Publication Data

US 2024/0203301 A1 Jun. 20, 2024

Related U.S. Application Data

(63) Continuation-in-part of application No. 18/067,053, filed on Dec. 16, 2022, now Pat. No. 12,121,164.

(51) Int. Cl.
*G09F 15/00* (2006.01)
*G09F 1/12* (2006.01)

(52) U.S. Cl.
CPC ............ *G09F 15/0018* (2013.01); *G09F 1/12* (2013.01); *G09F 15/0012* (2013.01); *G09F 15/0025* (2013.01); *G09F 2015/0093* (2013.01)

(58) Field of Classification Search
CPC .... G09F 15/0018; G09F 1/12; G09F 15/0012; G09F 15/0025; G09F 2015/0093; G09F 2007/1843; G09F 2007/1886
See application file for complete search history.

(56) References Cited

U.S. PATENT DOCUMENTS

| | | |
|---|---|---|
| 4,145,828 A | 3/1979 | Hillstrom |
| 6,088,942 A | 7/2000 | Brooks et al. |
| 7,861,448 B2 | 1/2011 | Povilaitis |
| 8,595,966 B2 | 12/2013 | Breihof |
| 8,881,440 B2 | 11/2014 | Shavelkin |
| 9,343,005 B2 | 5/2016 | Suciu |
| 9,715,842 B2 | 7/2017 | Mileski |
| 10,100,856 B2 | 10/2018 | Schuh |

(Continued)

FOREIGN PATENT DOCUMENTS

| | | |
|---|---|---|
| DE | 102004063366 B3 | 6/2006 |

OTHER PUBLICATIONS

International Application No. PCT/US2023/082468, International Search Report and Written Opinion, mailed Mar. 18, 2024.

*Primary Examiner* — Cassandra Davis
(74) *Attorney, Agent, or Firm* — MARSHALL, GERSTEIN & BORUN LLP; Michael P. Furmanek

(57) ABSTRACT

The present disclosure is directed to a mounting bracket assembly for displaying a banner including a base plate having a proximal end and a distal end. The base plate includes a first clamping surface, an upwardly-extending stretch arm at the distal end of the base plate, and a vertical channel disposed between the first clamping surface and the upwardly-extending stretch arm. Additionally, the mounting bracket assembly includes a clamping arm removably coupled to the base plate. The clamping arm has a proximal end and a distal end. In some examples, the clamping arm includes a second clamping surface and a downwardly-extending stretch arm disposed at the distal end of the clamping arm. The downwardly-extending stretch arm may be configured to extend into the vertical channel of the base plate. The mounting bracket assembly may further include a cover configured to couple to the base plate over the clamping arm.

21 Claims, 13 Drawing Sheets

(56) References Cited

U.S. PATENT DOCUMENTS

| | | | |
|---|---|---|---|
| 10,285,516 | B2 | 5/2019 | Bassouls |
| 10,482,796 | B2 | 11/2019 | Kobayashi |
| 11,027,566 | B2 | 6/2021 | Parellada Armela et al. |
| 2006/0145047 | A1 | 7/2006 | Allekotte |
| 2008/0148615 | A1 | 6/2008 | Mileski |
| 2009/0307949 | A1 | 12/2009 | Povilaitis |
| 2010/0299984 | A1 | 12/2010 | Khieu |
| 2017/0261018 | A1* | 9/2017 | Gibb ......................... G09F 7/18 |

* cited by examiner

TENSIONING FRAME FOR SHEET MEDIA

CROSS-REFERENCE TO RELATED APPLICATIONS

This is a continuation-in-part of U.S. patent application Ser. No. 18/067,053, filed Dec. 16, 2022, the entire contents of which are hereby incorporated by reference herein.

FIELD OF THE DISCLOSURE

The present disclosure relates to assemblies and systems for displaying banners and, more particularly, to tensioning frames for sheet media.

BACKGROUND

The display of large banners requires professionally installed frames. These frames support the banner and stretch the banner taut. The banners need to be stretched tight to ensure best visual appearance in the frame. As a result, the banners generally need to be stretched and supported on all four sides. In addition to keeping the banner stretched taut, the frame can also provide a floating appearance.

In some situations, the frame becomes part of the aesthetic design of the banner. But, some frames include fasteners and various screws to secure the banner to the frame. Unfortunately, the fasteners and screws increases the complexity of securing a banner in the frame. Additionally, exposed screws can detract from the overall appearance of the banner.

SUMMARY

A first aspect of the present disclosure is directed to a mounting bracket assembly including a base plate having a proximal end and a distal end. The base plate includes a first clamping surface disposed between the proximal and distal ends of the base plate, an upwardly-extending stretch arm at the distal end of the base plate, and a vertical channel disposed between the first clamping surface and the upwardly-extending stretch arm. Additionally, the mounting bracket assembly may include a clamping arm removably coupled to the base plate. The clamping arm includes a proximal end and a distal end. In some examples, the clamping arm includes a second clamping surface between the proximal and distal ends of the clamping arm, and a downwardly-extending stretch arm disposed at the distal end of the clamping arm. The downwardly-extending stretch arm may be configured to extend into the vertical channel of the base plate. Further, the mounting bracket assembly may include a cover configured to couple to the base plate over the clamping arm.

In some variations, the cover is coupled to the proximal end of the base plate and configured to move between an open position and a closed position relative to the base plate and clamping arm. In such variations, the cover disposed over the clamping arm in the closed position. Additionally, the base plate may be one-piece, the clamping arm may be one-piece, and/or the cover may be one-piece.

In other variations, the mounting bracket assembly may further include a reusable adhesive disposed on the first clamping surface. Additionally, the second clamping surface may further comprise a gripping element. In some examples, the gripping element comprises a plurality of teeth.

In yet other variations, the base plate can include a bottom surface, the first clamping surface being disposed above the bottom surface. Further, an upper surface of the upwardly-extending stretch arm may be higher than the first clamping surface.

In some variations, the cover moves about a pivot axis disposed on the proximal end of the base plate. Additionally, the base plate may further include a horizontal channel at the proximal end of the base plate, the horizontal channel configured to receive the proximal end of the clamping arm. As a result, the proximal end of the clamping arm can engage a wall of the horizontal channel to define a fulcrum.

In some variations, the downwardly-extending stretch arm can include a foot disposed at a terminal end thereof. The foot can be configured to be disposed in the vertical channel of the base plate.

In yet further alternatives, the mounting bracket assembly may include a fastener disposed through the clamping arm and first clamping surface of the base plate. In such an alternative, the cover is configured to be disposed over the fastener in the closed position.

Another aspect of the present disclosure is directed to a mounting bracket and banner tensioning system including a first mounting bracket and a second mounting bracket. The first mounting bracket includes a first base plate having a first clamping surface, a first upwardly extending stretch arm, and a first vertical channel disposed between the first clamping surface and the first upwardly-extending stretch arm. The first mounting bracket may also include a first clamping arm removably coupled to the first base plate, the first clamping arm having a first clamping arm clamping surface and a first downwardly extending stretch arm. Additionally, the first mounting bracket may include a first cover coupled to the first base plate. Also, the second mounting bracket, disposed opposite the first mounting bracket, including a second base plate having a second clamping surface, a second upwardly extending stretch arm, and a second vertical channel disposed between the second clamping surface and the second upwardly-extending stretch arm. The second mounting bracket may further include a second clamping arm removably coupled to the second base plate, the second clamping arm having a second clamping arm clamping surface and a second downwardly extending stretch arm. Also the second mounting bracket assembly may include a second cover coupled to the second base plate. The banner tensioning system may further include a banner having a first end secured between the first clamping surface and the first clamping arm clamping surface and a second end secured between the second clamping surface and the second clamping arm clamping surface, the banner stretched tight between the first mounting bracket and the second mounting bracket when the banner is stretched by the first downwardly extending stretch arm disposed in the first vertical channel and the second downwardly extending stretch arm disposed in the second vertical channel.

In some variations, the mounting bracket and banner tensioning system may include a reusable adhesive disposed on the first clamping surface and the second clamping surface. The system may further include fastening the first end of the banner to the first mounting bracket with at least one first fastener and fastening the second end of the banner to the second mounting bracket with at least one second fastener. Additionally the banner may be further stretched by extending the banner from the first downwardly extending stretch arm to the first upwardly extending stretch arm and extending the banner from the second downwardly extending stretch arm to the second upwardly extending stretch arm In other variations, the first cover may be configured to couple to the first base plate over the at least one first fastener and the second cover may be configured to couple to the second base plate over the at least one second fastener.

In some variations, the first downwardly-extending stretch arm can include a first foot disposed at a terminal end thereof. The first foot can be disposed in the first vertical channel of the first base plate and in contact with the banner when the banner is stretched by the first downwardly extending stretch arm. Moreover, the second downwardly-extending stretch arm can include a second foot disposed at a terminal end thereof. The second foot can be disposed in the second vertical channel of the second base plate and in contact with the banner when the banner is stretched by the second downwardly extending stretch arm.

Yet another aspect of the present disclosure is directed to a method of displaying and tensioning a banner. The method may include placing a first end of the banner on a first clamping surface of a first mounting bracket assembly and a second end of the banner on a first clamping surface of a second mounting bracket assembly. The first mounting bracket assembly may include a first base plate, a first clamping arm, and a first cover and the second mounting bracket may include a second base plate, a second clamping arm, and a second cover. The method may further include securing the first end of the banner in the first mounting bracket and the second end of the banner in the second mounting bracket and then stretching the banner between the first base plate and first clamping arm and the second base plate and second clamping arm. In some examples, the method includes fastening the first clamping arm to the first base plate and the second clamping arm to the second base plate. Additionally, the method may include disposing the first cover over the first clamping arm and the second cover over the second clamping arm.

In some variations, fastening the first clamping arm to the first base plate includes fastening a screw through the first clamping arm and the first base plate. Additionally, stretching the banner between the first base plate and the first clamping arm may include stretching the banner between a downwardly-extending stretch arm disposed on the first clamping arm and an upwardly-extending stretch arm disposed on the first base plate. In some examples, the method further includes disposing the first mounting bracket assembly opposite the second mounting bracket assembling.

In some variations, stretching the banner between a downwardly-extending stretch arm disposed on the first clamping arm and an upwardly-extending stretch arm disposed on the first base plate comprises stretching the banner between a foot disposed at a terminal end of the downwardly-extending stretch arm and the upwardly-extending stretch arm.

BRIEF DESCRIPTION OF THE DRAWINGS

It is believed that the disclosure will be more fully understood from the following description taken in conjunction with the accompanying drawings. Some of the drawings may have been simplified by the omission of selected elements for the purpose of more clearly showing other elements. Such omissions of elements in some drawings are not necessarily indicated of the presence or absence of particular elements in any of the exemplary embodiments, except as may be explicitly delineated in the corresponding written description. Also, none of the drawings are necessarily to scale.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercial feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

In accordance with the present disclosure, the tensioning frame includes a mounting bracket assembly and banner tensioning system for displaying and tensioning a banner, such as a vinyl banner or poster. Additionally, the mounting bracket assembly includes fasteners and a cover configured to cover the fasteners and improve the overall appearance of the frame. In some examples, the tensioning frame provides an easy and simple system for displaying banner displays.

Figure 1:
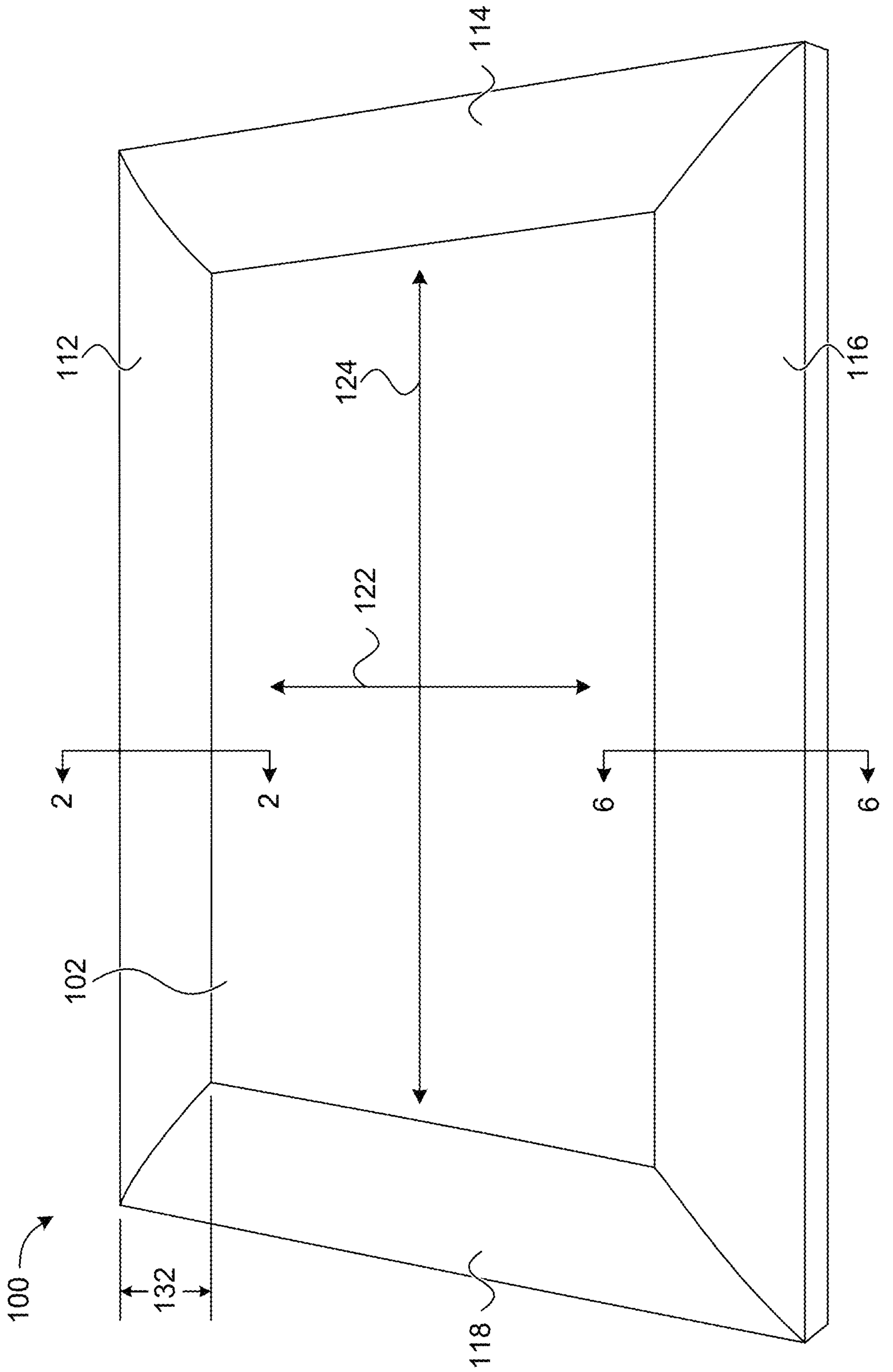
FIG. 1 is a perspective view of mounting bracket and banner tensioning system made in accordance with the present disclosure.

FIG. 1 illustrates a tensioning frame 100 for a display banner 102. The tensioning frame 100 includes a first mounting bracket assembly 112, a second mounting bracket assembly 114, a third mounting bracket assembly 116, and a fourth mounting bracket assembly 118. In the example of FIG. 1, the display banner 102 is stretched in a first direction 122 between the first and third mounting brackets 112, 116 and stretched in a second direction 124 between the second and fourth mounting brackets 114, 118. As a result, the banner 102 is evenly taut between every mounting bracket 112, 114, 116, 118. In some examples, the tensioning frame can include only a pair of opposing mounting bracket assemblies (e.g., first and third mounting bracket assemblies 112, 116 or second and fourth mounting bracket assemblies 116, 118) tensioning the banner in a single direction. Additionally, as shown in FIG. 1, the tensioning frame 100 does not show any screws or fasteners in its final assembled condition. In various examples, the mounting bracket assemblies 112, 114, 116, 118 define a width 132 sufficient to retain the banner 102 but maintain aesthetic appeal. For example, the width 132 may be approximately 2.5 inches (in.), but may be 1 in., 1.5 in., 3 in., 4 in., etc.

Figure 2:
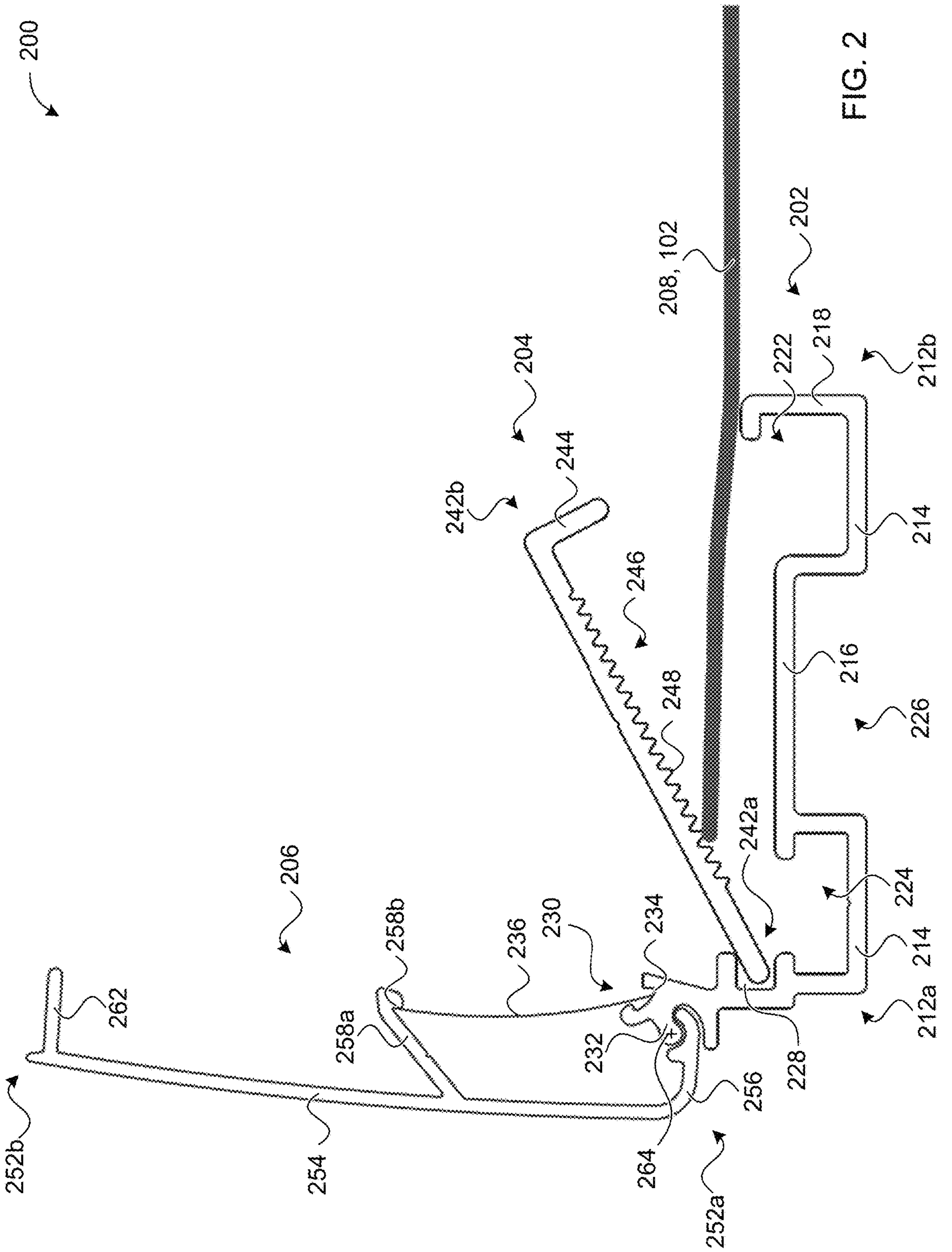
FIG. 2 is a cross sectional view of a first example mounting bracket in an open configuration made in accordance with one embodiment of the present disclosure.
Figure 3:
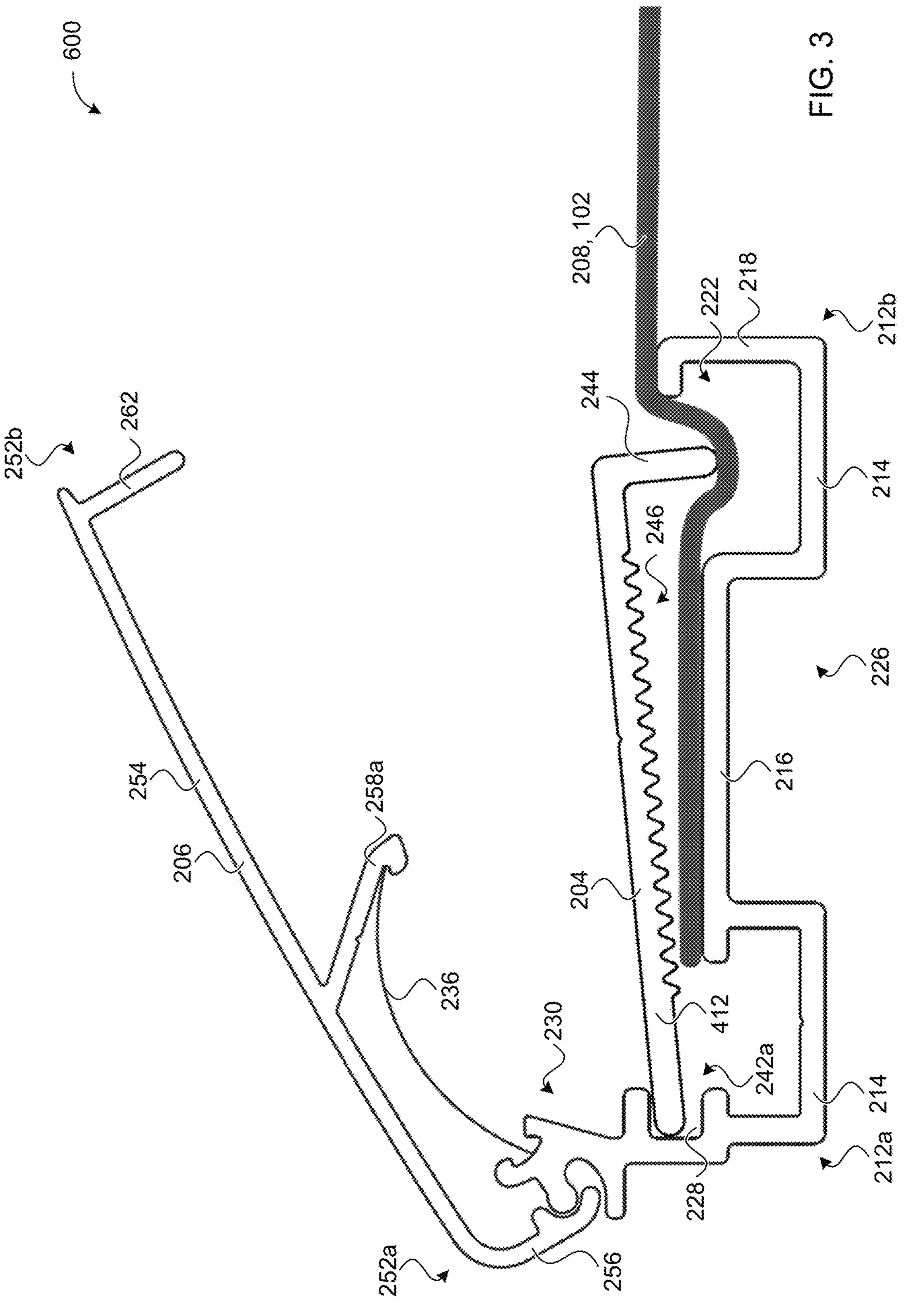
FIG. 3 is a cross sectional view of the first example mounting bracket of FIG. 2 made in accordance with the present disclosure.
Figure 4:
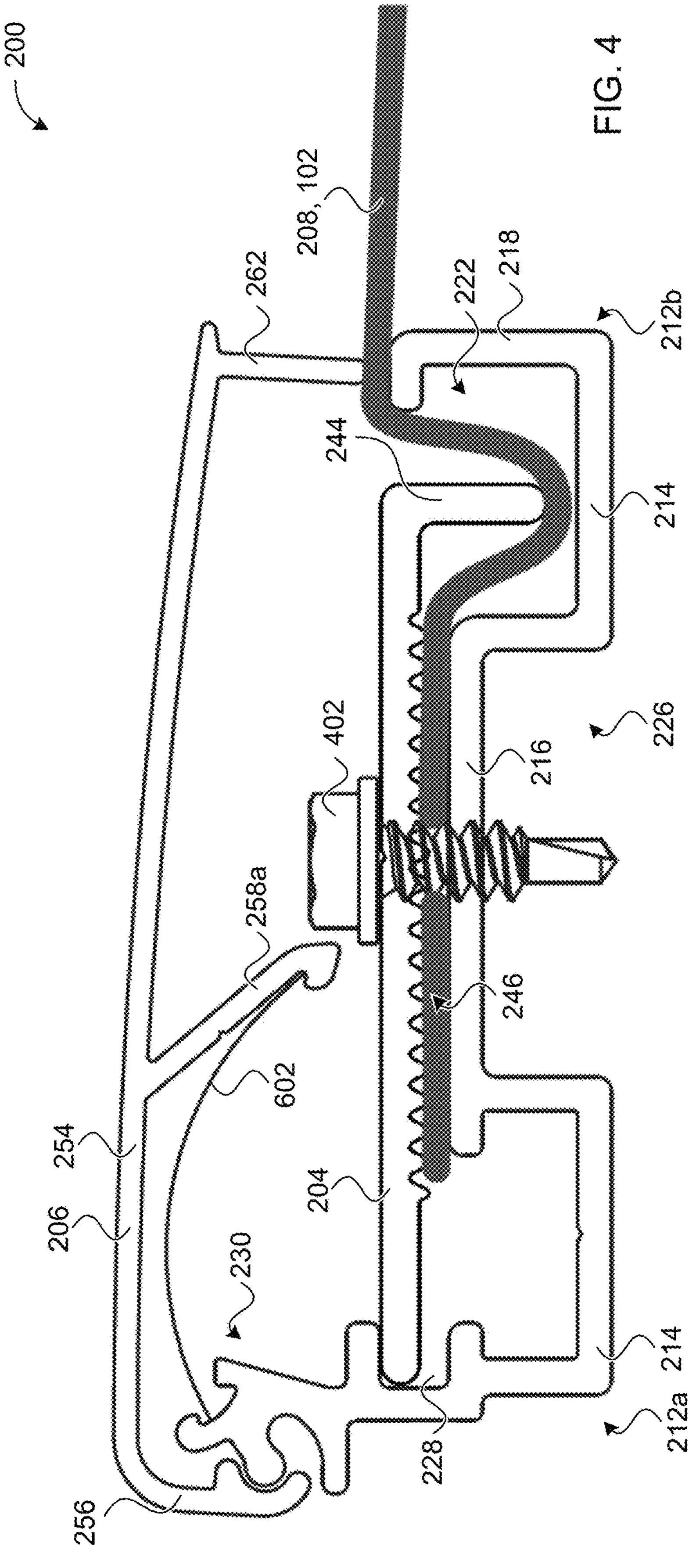
FIG. 4 is a cross sectional view of the first example mounting bracket of FIG. 2 in a closed configuration made in accordance with the present disclosure.

FIGS. 2-4 illustrate a cross-section of a first example mounting bracket assembly 200 (e.g., the first mounting bracket 112 of FIG. 1). FIG. 2 illustrates the mounting bracket 200 in an open configuration. The mounting bracket 200 includes a base plate 202, a clamping arm 204, and a cover 206. As shown in FIG. 2, the mounting bracket assembly 200 is configured to receive a display banner 208 (similar to display banner 102) made of a plastic (e.g., vinyl) or woven material. As a cross-section, each of the base plate 202, clamping arm 204, and cover 206 extend linearly and generally uniformly perpendicular to the figures. As shown in FIG. 2, the base plate 202, clamping arm 204, and cover 206 are coupled together, but in other examples, the base plate 202, clamping arm 204, and cover 206 are separate and assembled upon installation. Additionally, the base plate 202, clamping arm 204, and cover 206 are each one-piece constructions, but in other examples, the base plate 202, clamping arm 204, and cover 206 may be multi-component pieces.

As illustrated in FIGS. 2-4, the base plate 202 includes a proximal end 212*a* and a distal end 212*b*. The base plate 202 further includes a bottom surface 214, a first clamping surface 216 disposed between the proximal end 212*a* and the distal end 212*b* and also above the bottom surface 214, and an upwardly-extending stretch arm 218 disposed on the distal end 212*b*.

The base plate 202 further includes a first, vertical channel 222, a second, vertical channel 224, a bottom recess 226, and a horizontal channel 228. The first vertical channel 222 is disposed between the stretch arm 218 and the first clamp surface 216 and near the distal end 212*b*. The horizontal channel 228 is disposed at the proximal end 212*a* of the base plate 202. The horizontal channel 228 is configured to receive the clamping arm 204 and discussed in greater detail in connection with FIG. 5.

The base plate 202 further includes a coupling body 230 disposed on the proximal end 212*a* of the base plate 202. The coupling body 230 is configured to couple the cover 206 to the base plate 202. The coupling body 230 includes a rotational coupling arm 232 and a leaf spring shackle 234. The cover 206 is removably coupled to the coupling body 230 with a leaf spring 236. In other examples, the cover 206 may be coupled to the base plate 202 in any other manner.

The clamping arm 204 includes a proximal end 242*a* and a distal end 242*b*. The proximal end 242*a* is received in the horizontal channel 228. The distal end 242*b* of the clamping arm 204 includes a downwardly-extending stretch arm 244. Additionally, the clamping arm 204 includes a second clamping surface 246 disposed between the proximal end 242*a* and the distal end 242*b*. In various examples, the second clamping surface 246 includes a gripping element 248 such as a plurality of teeth as illustrated in FIG. 3. In various other examples, the gripping element 248 could be another structure or include an adhesive.

The cover 206 defines a proximal end 252*a* and a distal end 252*b* and a cover panel 254 extending between the proximal end 252*a* and the distal end 252*b*. The cover 206 includes a hinge 256 disposed on the proximal end 252*a*. Additionally, the cover 206 includes a structural arm 258*a* including a leaf spring shackle 258*b*. The hinge 256 in combination with the leaf spring 236 properly disposed in the leaf spring shackle 258*b* are configured to removably couple the cover 206 to the base plate 202. Additionally, the cover 206 includes a front cover plate 262. In some examples, the cover panel 254 includes a colored surface, patterned veneer, or other decorative surface. As discussed above, the width (e.g., width 132) of the cover 206 may be configured to be aesthetically pleasing. For example, the width may be approximately 2.5 inches (in.). However, the cover 206 may be any width sufficient to cover the clamping arm 204 and the base 202 while also being aesthetically pleasing.

The clamping arm 204 and the cover 206 are removably coupled to the base plate 202. Specifically, the proximal end 242*a* of the clamping arm 204 is received in the horizontal channel 228. The cover 206 is coupled to the coupling arm 232 disposed on the proximal end 212*a* of the base plate 202. As shown, the hinge 256 is pushed into the coupling body 230 due to the leaf spring 236 disposed between the coupling body 230 and the structural arm 258*a*. The leaf spring 236 exerts a force on both the coupling body 230 and the structural arm 258*a* causing the hinge 256 to be pushed into the coupling body 230. Furthermore, as shown in FIGS. 2-4, the cover 206 is configured to move between an open position and a closed position relative to the base plate 202 and clamping arm 304. For example, the hinge 256 is configured to pivot about a pivot axis 264 within the coupling arm 232. In various other examples, the pivot axis 264 could be disposed anywhere on the proximal end 212*a* of the base plate 202.

As shown in FIG. 2, the clamp arm 204 and cover 206 are disposed in an open position. As a result, the banner 208 can be placed on the first clamping surface 216. In some examples, the first clamping surface 216 includes an adhesive (such as a double-sided, adhesive tape) to retain the banner 208 on the first clamping surface 216. In some examples, the adhesive is a reusable adhesive that facilitates removably coupling multiple banners, similar to banner 208 In some examples, the banner 208 is not held taut when the banner 208 while the clamp arm 204 is in the open position. Alternatively, in some examples, the banner 208 can be held taut by the adhesive disposed on the first clamping surface 216.

In FIG. 3, the clamp arm 204 and the cover 206 are disposed in a partially open state (alternatively, a partially closed state). As the clamp arm 204 is pivoted towards the closed position, the proximal end 242*a* of the clamp arm 204 engages the horizontal channel 228 of the base plate 202 to define a fulcrum. As shown, the downwardly-extending clamp arm 244 of the clamp arm 204 has started stretching the banner 208. The clamp arm 244 stretches the banner 208 by pushing the banner 208 into the first, vertical channel 222. In some examples, pushing the banner 208 into the vertical channel 222 stretches the banner 208. Additionally or alternatively, pushing the banner 208 into the vertical channel 222 may draw excess material of the banner 208 into the vertical channel 222, thereby pulling the banner 208 taut.

FIG. 4 illustrates the mounting bracket assembly 200 in a closed position. In some examples, as illustrated in FIG. 4, the clamp arm 204 and banner 208 may be removably coupled to the base plate 202 via at least one fastener 402. The fastener 402 may include a screw, bolt, or other fastener that passes through the clamping arm 204 and first clamping surface 216 of the base plate 202. As shown, both the clamp arm 204 and the cover 206 are disposed in the closed position and the banner 208 is fully pulled taut between the downwardly-extending stretch arm 244 and the upwardly-extending stretch arm 218. Additionally, the cover 206 disposed over the clamping arm 204 in the closed position. As a result, the cover 206 hides the presence of the fastener 402 and the front cover plate 262 conceals the structures and mechanisms between the base plate 202 and the cover 206.

Figure 5:
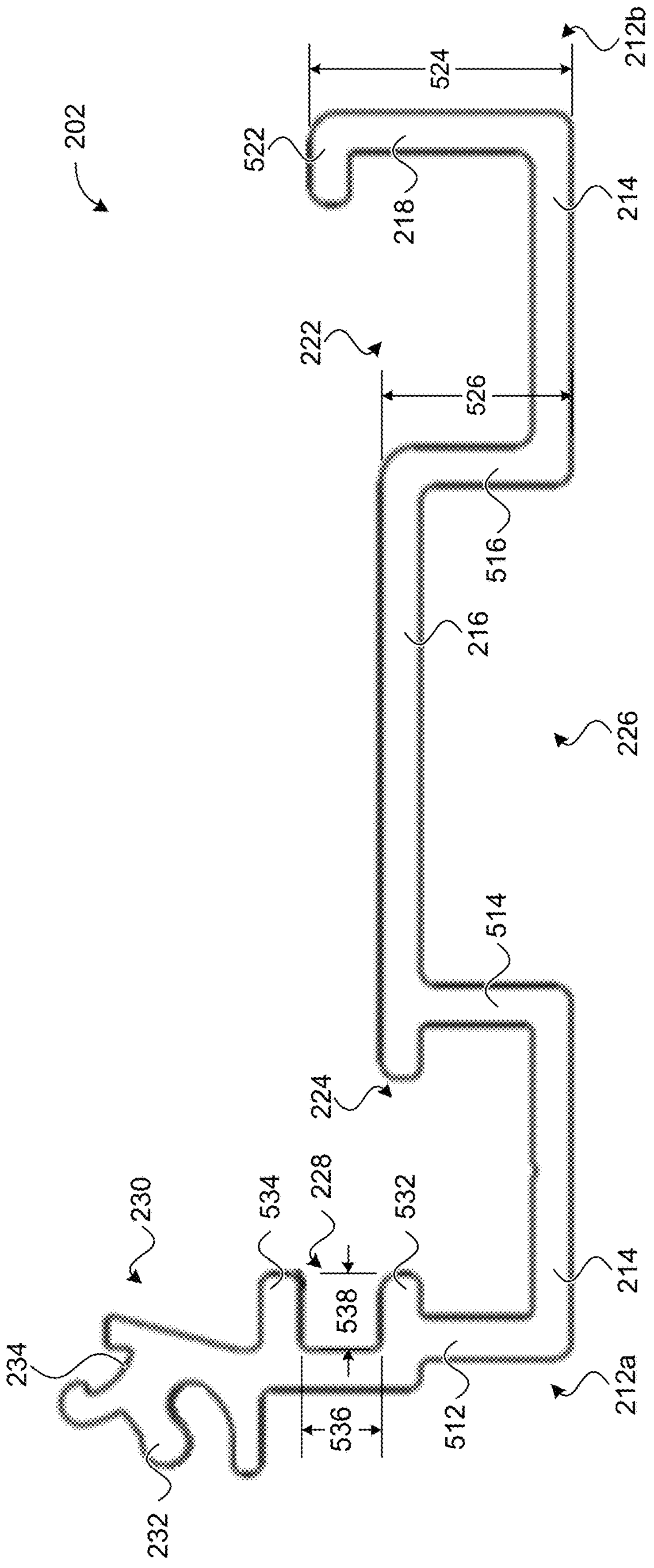
FIG. 5 is a cross sectional view of a base plate of the first example mounting bracket of FIGS. 2-4.

FIG. 5 illustrates the base plate 202 of FIGS. 2-4 in greater detail. The base plate 202 includes a back wall 512, a first support wall 514, and a second support wall 516. The first support wall 514 and the second support wall 516 are integrally formed with the first clamping surface 216 and the bottom surface 214. As shown in FIG. 5, the back wall 512, first support wall 514, second support wall 516, and the upwardly-extending stretch arm 218 are disposed perpendicular to the bottom surface 214. In various other examples, one or more of the back wall 512, first support wall 514, second support wall 516, and/or the stretch arm 218 may be disposed at an acute or obtuse angle relative to the bottom surface 214. As a result, the first vertical channel 222 is defined by the second support wall 516, the bottom surface 214, and the stretch arm 218. The first vertical channel 222 defines a generally rectangular cross-sectional area, but in other examples, the first vertical channel 222 can define any cross-sectional shape area. Additionally, in some examples, the stretch arm 218 includes an upper surface 522. The upper surface 522 may, as illustrated, at least partially overhangs the first vertical channel 222.

The upper surface 522 of the stretch arm 218 is disposed at a first height 524 and the first clamping surface 216 is disposed at a second height 526. As shown, the first height 524 of the upper surface 522 is higher than the second height 526 of the first clamping surface 216. In some examples, the first height 524 and the second height 526 could be the same. Additionally, the first clamping surface 216 is disposed approximately centrally between the proximal end 212*a* and the distal end 212*b*. In other examples, the first clamping surface 216 could be disposed at or closer to one of the proximal end 212*a* or the distal end 212*b*.

The second, vertical channel 224 is disposed at the proximal end 212*a* and opposite the first, vertical channel 222. The second vertical channel 224 is disposed between the back wall 512 and the first clamping surface 514. As a result, the second vertical channel 224 is defined by the back wall 512, the bottom surface 214, and the first support wall 514. The second, vertical channel 224 also defines a generally rectangular cross-sectional area, but in other examples, the second vertical channel 224 may have any other cross-sectional shape area. In some examples, the first clamping surface 216 at least partially overhangs the second, vertical channel 224. Generally speaking, the second, vertical channel 224 is configured to receive a fastener such as a screw for securing the mounting bracket assembly 200 to a wall or other vertical structure for displaying a banner. Specifically, although not illustrated, the bottom wall 214 of the base plate 202 can include a plurality of apertures, equally spaced along the length of the base plate 202. Each aperture can be configured to receive a fastener such as a screw, bolt, or other fastener for securing the mounting bracket assembly 200 in position.

The bottom recess 226 is disposed beneath the first clamping surface 216. The bottom recess 226 is defined by the first support wall 514, the first clamping surface 216, and the second support wall 516. While the bottom recess 226 defines a generally rectangular cross-sectional area, the cross-sectional area of the bottom recess 226 could be any alternative cross-sectional shape. In some examples, the bottom surface 214 encloses the bottom recess 226.

The horizontal channel 228 includes a bottom wall 532 and a top wall 534, both generally perpendicular to the back wall 512. In a preferred embodiment, the bottom wall 532 is disposed at the second height 526, but in other examples, the bottom wall 532 may be disposed at a height higher or lower than the second height 526. The bottom wall 532 and the top wall 534 define a height 536 and a depth 538 of the horizontal channel 228. Additionally, in some examples, the bottom wall 532 is configured to overhang the second, vertical channel 224.

The base plate 202 further includes the cover 206 coupling body 230 disposed on the proximal end 212*a* of the base plate 202. The coupling body 230 includes a rotational coupling arm 232 and a leaf spring shackle 234. As discussed in greater detail in connection with FIGS. 6-8, the cover 400 is removably coupled to the coupling body 270 with a leaf spring. In other examples, the cover 400 may be coupled to the base plate 202 in any other manner.

Figure 6:
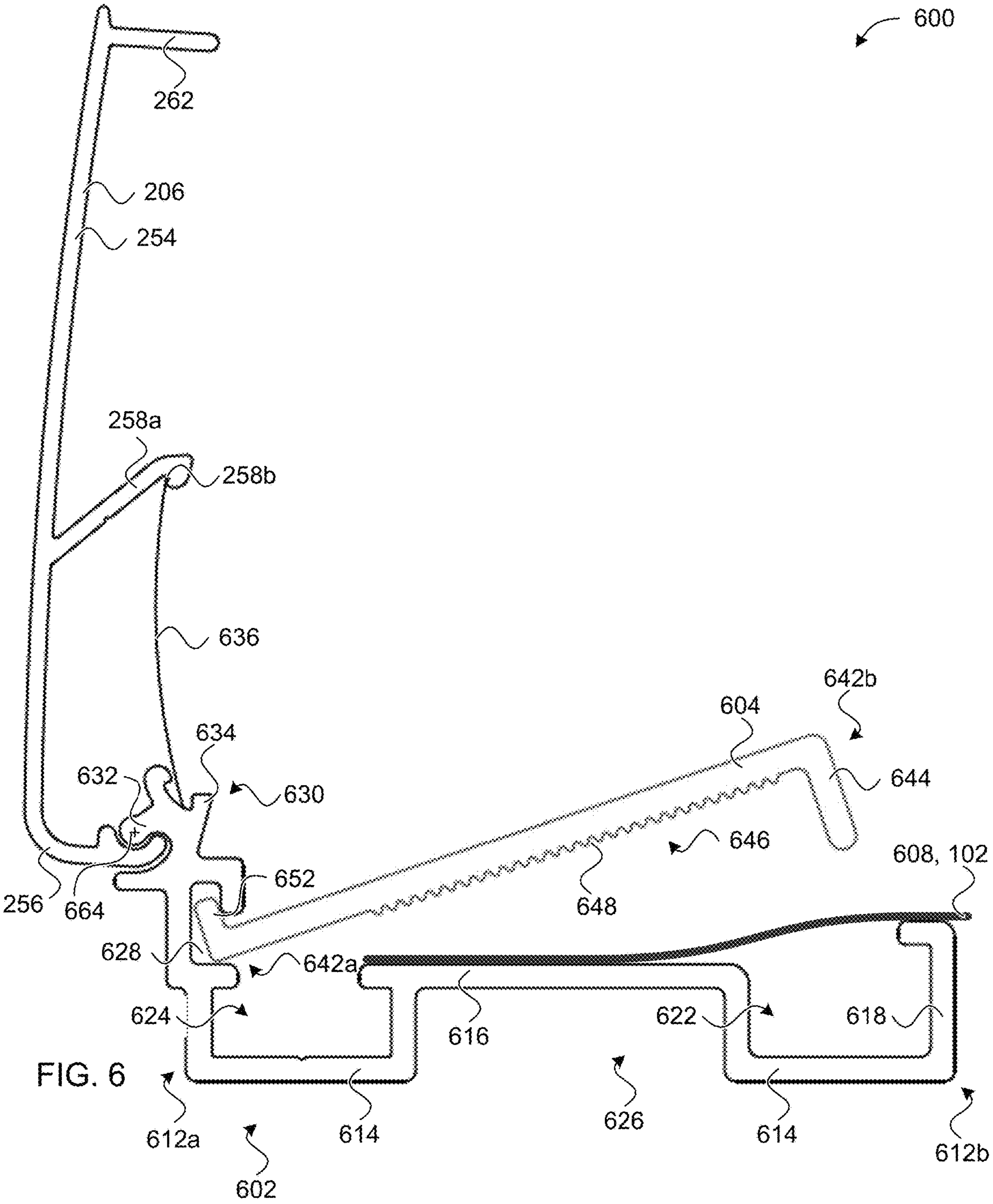
FIG. 6 is a cross sectional view of a second example mounting bracket in an open configuration made in accordance with a second embodiment of the present disclosure.
Figure 7:
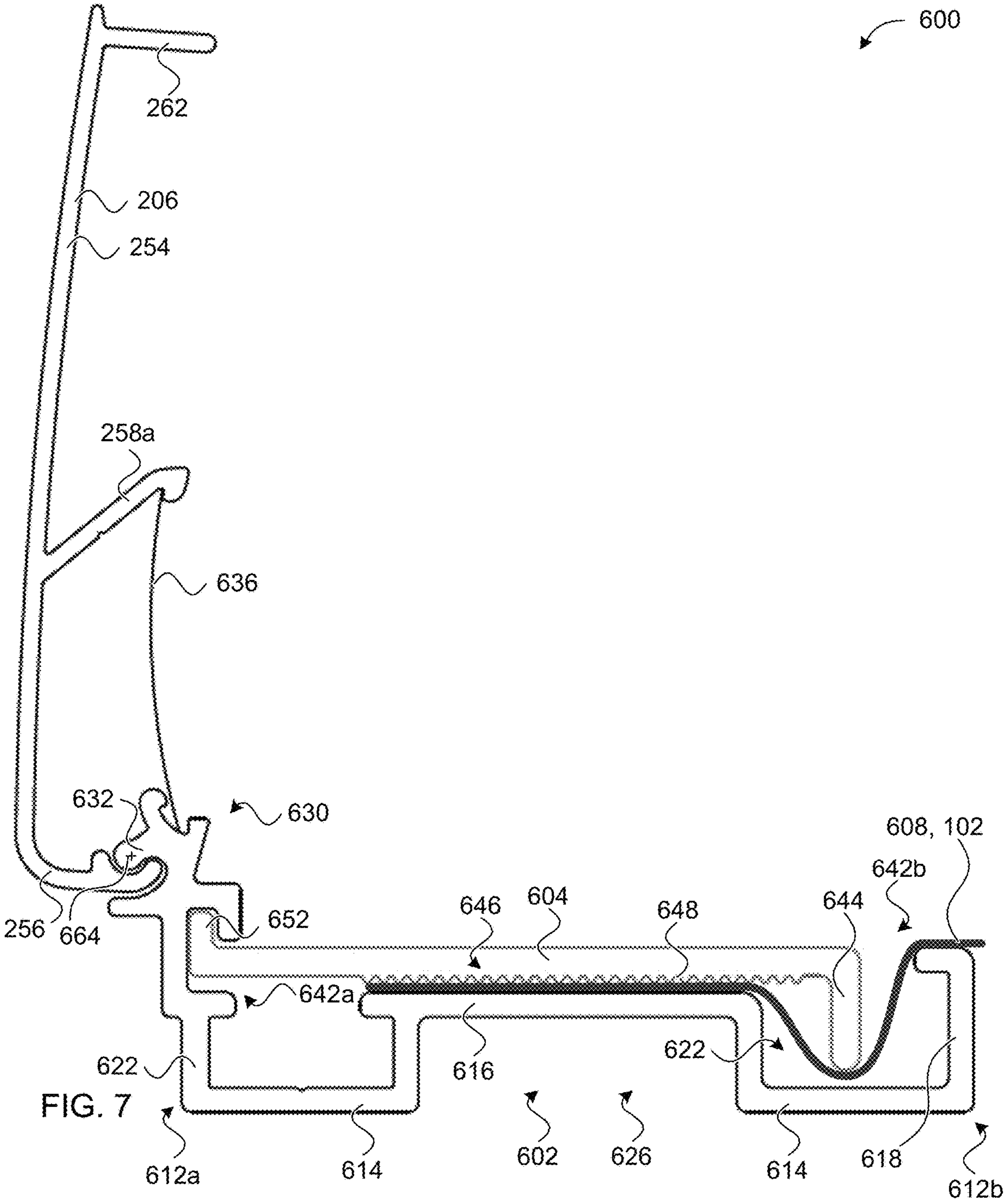
FIG. 7 is a cross sectional view of the second example mounting bracket of FIG. 6 made in accordance with the present disclosure.
Figure 8:
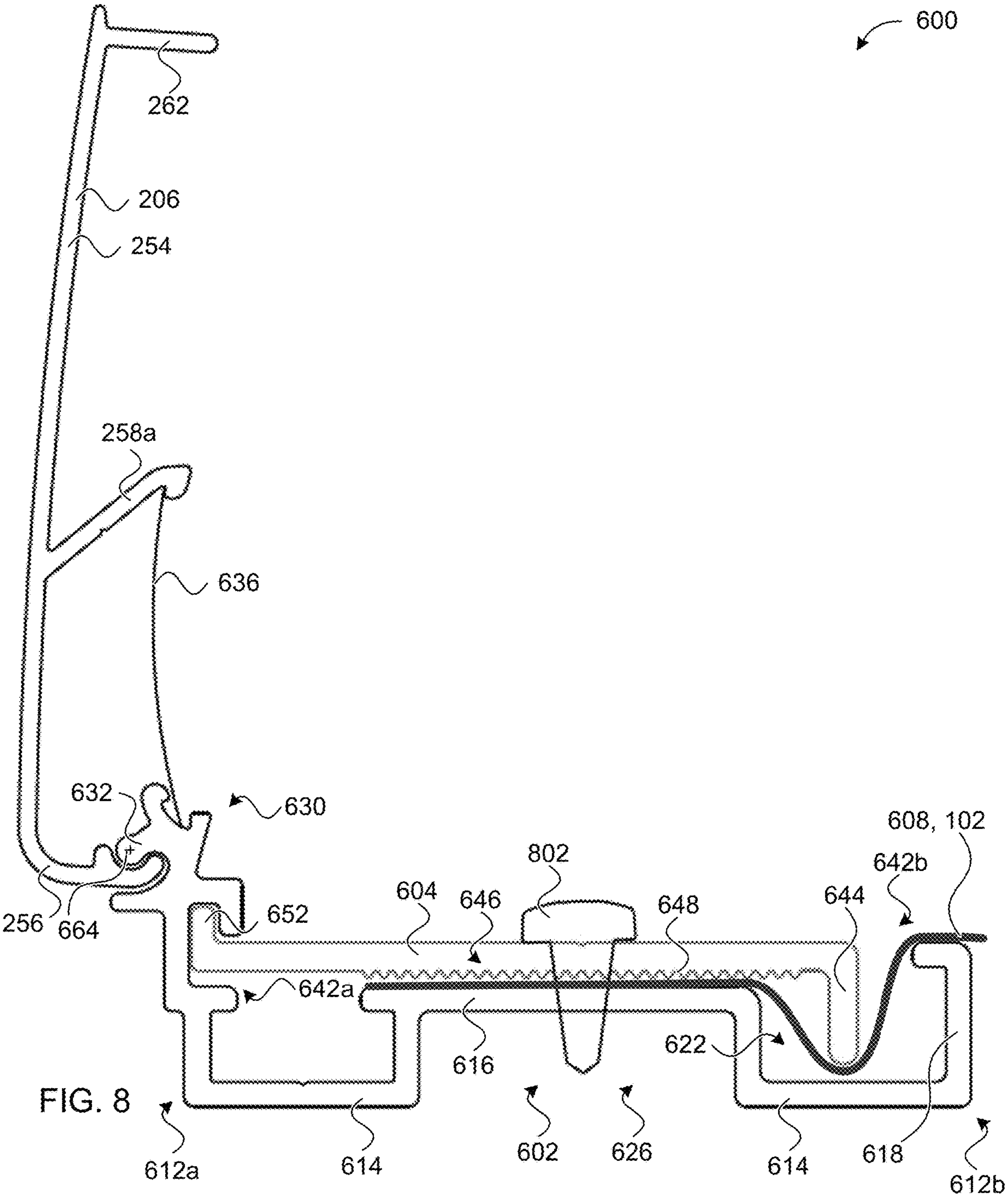
FIG. 8 is a cross sectional view of the second example mounting bracket of FIG. 6 including a fastener made in accordance with the present disclosure.

FIGS. 6-8 illustrate a cross-section of the second example mounting bracket assembly 600 (e.g., the first mounting bracket 116 of FIG. 1). FIG. 6 illustrates the mounting bracket 600 in an open configuration. The mounting bracket 600 includes a base plate 602, a clamping arm 604, and a cover 206. As shown in FIG. 6, the mounting bracket assembly 600 is configured to receive a display banner 608 (similar to display banner 102) made of a plastic (e.g., vinyl) or woven material. As a cross-section, each of the base plate 602, clamping arm 604, and cover 206 extend linearly and generally uniformly perpendicular to the figures. As shown in FIG. 6, the base plate 602, clamping arm 604, and cover 206 are coupled together, but in other examples, the base plate 602, clamping arm 604, and cover 206 are separate and assembled upon installation. Additionally, the base plate 602, clamping arm 604, and cover 206 are each one-piece constructions, but in other examples, the base plate 602, clamping arm 604, and cover 206 may be multi-component pieces.

As illustrated in FIGS. 6-8, the base plate 602 includes a proximal end 612*a* and a distal end 612*b*. The base plate 602 further includes a bottom surface 614, a first clamping surface 616 disposed between the proximal end 612*a* and the distal end 612*b* and also above the bottom surface 614, and an upwardly-extending stretch arm 618 disposed on the distal end 612*b*.

The base plate 602 further includes a first, vertical channel 622, a second, vertical channel 624, a bottom recess 626, and a horizontal channel 628. The first vertical channel 622 is disposed between the stretch arm 618 and the first clamp surface 616 and near the distal end 612*b*. The horizontal channel 628 is disposed at the proximal end 612*a* of the base plate 602. The horizontal channel 628 is configured to receive the clamping arm 604 and discussed in greater detail in connection with FIG. 10.

The base plate 602 further includes a coupling body 630 disposed on the proximal end 612*a* of the base plate 602. The coupling body 630 is configured to couple the cover 206 to the base plate 602. The coupling body 630 includes a rotational coupling arm 632 and a leaf spring shackle 634. The cover 206 is removably coupled to the coupling body 630 with a leaf spring 636. In other examples, the cover 206 may be coupled to the base plate 602 in any other manner.

The clamping arm 604 includes a proximal end 642*a* and a distal end 642*b*. The proximal end 642*a* is received in the horizontal channel 628. The distal end 642*b* of the clamping arm 604 includes a downwardly-extending stretch arm 644. Additionally, the clamping arm 604 includes a second clamping surface 646 disposed between the proximal end 642*a* and the distal end 642*b*. In various examples, the second clamping surface 646 includes a gripping element 648 such as a plurality of teeth as illustrated in FIG. 6. In various other examples, the gripping element 648 could be another structure or include an adhesive. Furthermore, different from the clamp arm 204 of FIG. 2, the clamp arm 604 includes an upwardly-extending arm 652 configured to be received in a vertical recess 1056 of the horizontal channel 628 (the horizontal channel 628 discussed in greater detail in connection with FIG. 10).

As illustrated, the clamping arm 604 and the cover 206 are removably coupled to the base plate 602. Specifically, the cover 206 is coupled to the proximal end 612*a* of the base plate 602. As shown, the hinge 256 is pushed into the coupling body 630 due to the leaf spring 636 disposed between the coupling body 630 and the structural arm 658*a*. The leaf spring 636 exerts a force on both the coupling body 630 and the structural arm 658*a* causing the hinge 256 to be pushed into the coupling body 630. Furthermore, the cover 206 is configured to move between an open position and a closed position relative to the base plate 602 and clamping arm 604. For example, the hinge 256 is configured to pivot about a pivot axis 664 within a coupling arm 632. In various other examples, the pivot axis 664 could be disposed anywhere on the proximal end 612*a* of the base plate 602.

FIG. 6 illustrates the clamping arm 604 and the cover 206 disposed in an open position. As a result, the banner 608 can be placed onto the first clamping surface 616 of the base plate 602. In some examples, the banner 608 can be made of a plastic (e.g., vinyl) or woven material. In some examples, the first clamping surface 616 includes an adhesive (such as a double-sided, adhesive tape) to retain the banner 608 on the first clamping surface 616. In some examples, the adhesive is a reusable adhesive that facilitates removably coupling multiple banners, similar to banner 608. In some examples, the banner 608 is not held taut when the banner 608 while the clamp arm 604 is in the open position. Alternatively, in some examples, the banner 608 can be held taut by the adhesive disposed on the first clamping surface 616.

In FIG. 7, the clamp arm 604 is pivoted into a closed position while the cover 206 is still disposed in an open state. The proximal end 642*a* of the clamp arm 604 engages the horizontal channel 628 of the base plate 602 to define a fulcrum. Also shown, the downwardly-extending stretch arm 644 of the clamp arm 604 has stretched the banner 608 between the downwardly-extending stretch arm 644 and the upwardly-extending stretch arm 618. The clamp arm 644 stretches the banner 608 by pushing the banner 608 into the first, vertical channel 622. In some examples, pushing the banner 608 into the vertical channel 622 stretches the banner 608. Additionally or alternatively, pushing the banner 608 into the vertical channel 622 may draw excess material of the banner 608 into the vertical channel 622, thereby pulling the banner 608 taut.

FIG. 8 illustrates at least one fastener 802 disposed through the clamp arm 604 and the base plate 602. The fastener 802 may include a screw, bolt, or other fastener that passes through the clamping arm 604 and first clamping surface 616 of the base plate 602.

Figure 9:
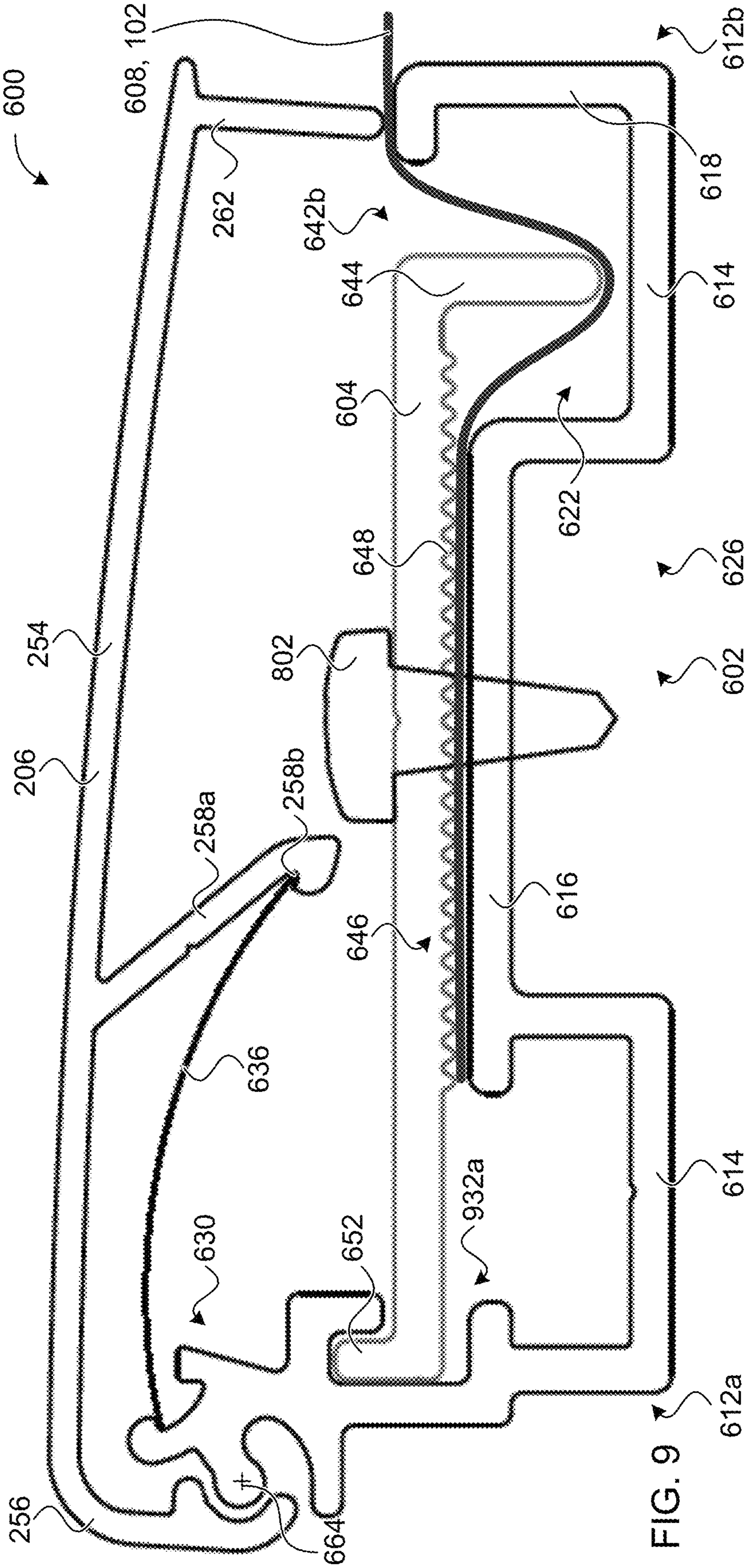
FIG. 9 is a cross sectional view of the second example mounting bracket of FIG. 6 in a closed configuration made in accordance with the present disclosure.

FIG. 9 illustrates the mounting bracket assembly 600 in a closed position. As shown, both the clamp arm 604 and the cover 206 are disposed in the closed position and the banner 608 is pulled fully taut between the downwardly-extending stretch arm 644 and the upwardly-extending stretch arm 618. Additionally, the cover 206 is disposed over the clamping arm 604 in the closed position. As a result, the cover 206 hides the presence of the fastener 802 and the front cover plate 262 conceals the structures and mechanisms between the base plate 602 and the cover 604.

Figure 10:
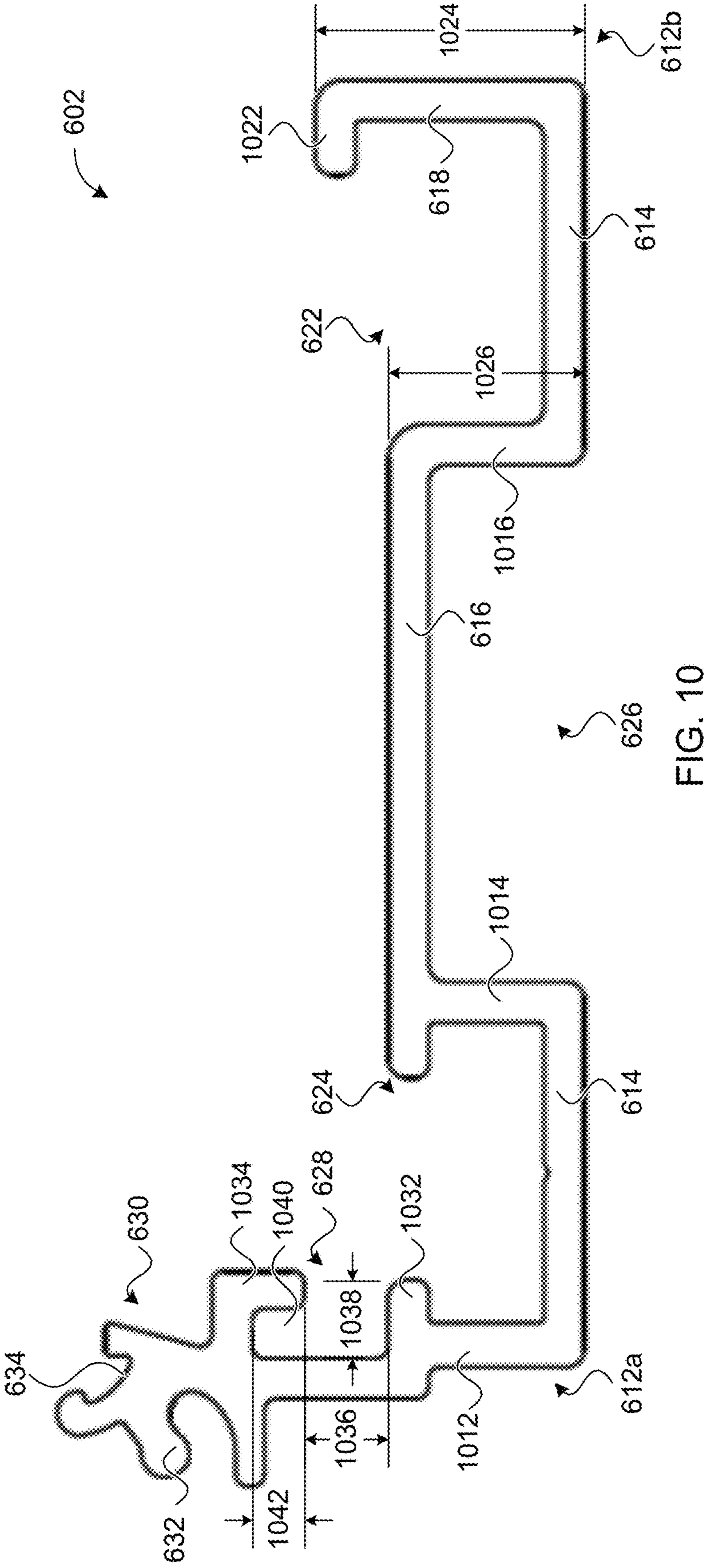
FIG. 10 is a cross sectional view of a base plate of the second example mounting bracket of FIGS. 6-9.

FIG. 10 illustrates the base plate 602 of FIGS. 6-9 in greater detail. The base plate 602 includes a back wall 1012, a first support wall 1014, and a second support wall 1016. The first support wall 1014 and the second support wall 1016 are integrally formed with the first clamping surface 616 and the bottom surface 614. As shown in FIG. 10, the back wall 1012, first support wall 1014, second support wall 1016, and the upwardly-extending stretch arm 618 are disposed perpendicular to the bottom surface 614. In various other examples, one or more of the back wall 1012, first support wall 1014, second support wall 1016, and/or the stretch arm 618 may be disposed at an acute or obtuse angle relative to the bottom surface 614. As a result, the first vertical channel 622 is defined by the second support wall 616, the bottom surface 614, and the stretch arm 618. The first vertical channel 622 defines a generally rectangular cross-sectional area, but in other examples, the first vertical channel 622 can define any cross-sectional shape area. Additionally, in some examples, the stretch arm 618 includes an upper surface 1022. The upper surface 1022 may, as illustrated, at least partially overhangs the first vertical channel 622.

The upper surface 1022 of the stretch arm 618 is disposed at a first height 1024 and the first clamping surface 616 is disposed at a second height 1026. As shown, the first height 1024 of the upper surface 1022 is higher than the second height 1026 of the first clamping surface 616. In some examples, the first height 1024 and the second height 1026 could be the same. Additionally, the first clamping surface 616 is disposed approximately centrally between the proximal end 612*a* and the distal end 612*b*. In other examples, the first clamping surface 616 could be disposed at or closer to one of the proximal end 612*a* or the distal end 612*b*.

The second, vertical channel 624 is disposed at the proximal end 612*a* and opposite the first, vertical channel 622. The second vertical channel 624 is disposed between the back wall 1012 and the first clamping surface 1014. As a result, the second vertical channel 624 is defined by the back wall 1012, the bottom surface 614, and the first support wall 1014. The second, vertical channel 624 also defines a generally rectangular cross-sectional area, but in other examples, the second vertical channel 624 may have any other cross-sectional shape area. In some examples, the first clamping surface 616 at least partially overhangs the second, vertical channel 624.

The bottom recess 626 is disposed beneath the first clamping surface 616. The bottom recess 626 is defined by the first support wall 1014, the first clamping surface 616, and the second support wall 1016. While the bottom recess 626 defines a generally rectangular cross-sectional area, the cross-sectional area of the bottom recess 626 could be any alternative cross-sectional shape. In some examples, the bottom surface 614 encloses the bottom recess 626.

The horizontal channel 628 is disposed on the back wall 1012. The horizontal channel 628 includes a bottom wall 1032 and a top wall 1034, both generally perpendicular to the back wall 1012. In a preferred embodiment, the bottom wall 1032 is disposed at the second height 1026, but in other examples, the bottom wall 1032 may be disposed at a height higher or lower than the second height 1026. The bottom wall 1032 and the top wall 1034 define a height 1036 and a depth 1038 of the horizontal channel 628. The vertical recess 1056 may further define a recess height 1040 configured to receive the upwardly-extending arm 652. When the upwardly-extending arm 652, the clamp arm 604 defines a fulcrum with the top wall 1034. Additionally, in some examples, the bottom wall 1032 is configured to overhang the second, vertical channel 624.

The base plate 602 further includes the cover 206 coupling body 630 disposed on the proximal end 612*a* of the base plate 602. The coupling body 630 includes a rotational coupling arm 632 and a leaf spring shackle 634. As discussed in greater detail in connection with FIGS. 6-8, the cover 206 is removably coupled to the coupling body 630 with a leaf spring. In other examples, the cover 206 may be coupled to the base plate 602 in any other manner.

Returning to FIG. 1, when placing the display banner 102 in the tensioning frame 100, each of the first mounting bracket assembly 112, the second mounting bracket assembly 114, the third mounting bracket assembly 116, and the fourth mounting bracket assembly 118 are originally disposed in the open position (e.g., as shown in FIGS. 2 and 6). As a result, the display banner 102 can be placed on the first clamping surface of each of the mounting bracket assemblies 112, 114, 116, 118 (e.g., first clamping surface 216, 616). In some examples, the display banner 102 is partially pulled taut when being placed on the first clamping surfaces, but in some examples, the display banner 102 is placed in the tensioning frame 100 loosely.

After the display banner 102 is placed in the tensioning frame 100, the display banner 102 is stretched between the base plate (e.g., base plate 202, 602) and the clamping arm (e.g., clamp arm 204, 604). For example, the display banner 102 is stretched in the first direction 122 between the first and third mounting bracket assemblies 112, 116 (disposed opposite each other) when the downwardly-extending stretch arms are inserted into the first vertical channels of the corresponding base plates. Additionally, the display banner 102 is stretched in the second direction 124 between the second and fourth mounting bracket assemblies 114, 118 when the downwardly-extending clamp arms (e.g., clamp arm 204, 604) are inserted into the first vertical channels of the corresponding base plates (e.g., base plate 202, 602). In some examples, the display banner 102 needs to only be stretched in one of the first direction 122 or the second direction 124.

After the display banner 102 is stretched between the clamp arm (e.g., clamp arm 204, 604) and the base plate (e.g., base plate 202, 602) of each of the first, second, third, and fourth mounting bracket assemblies 112, 114, 116, 118, the fastener (e.g., fastener 402, 802) is passed through the clamp arm and the base plate to removably fasten the clamp arm and the base plate together. After the fastener (e.g., fastener 802, 1102) couples the clamp arm to the base plate, the cover (e.g., the cover 206) is rotated to cover the base plate, cover arm, and fastener. As a result, when the cover is closed over the base plate, the tensioning frame 100 and display banner 102 form an aesthetically pleasing display.

Figure 11:
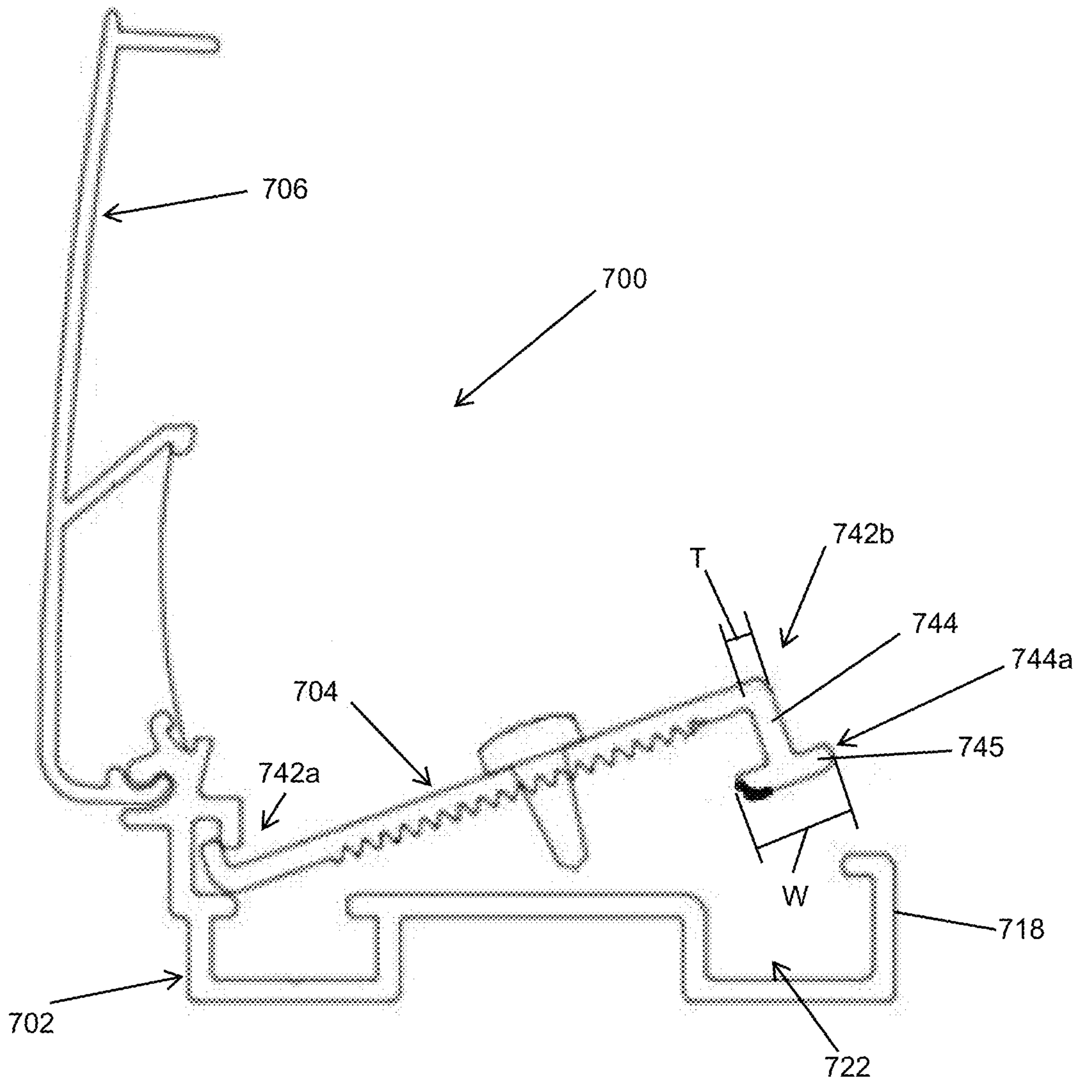
FIG. 11 is a cross sectional view of a third example mounting bracket in an open configuration made in accordance with a third embodiment of the present disclosure.
Figure 12:
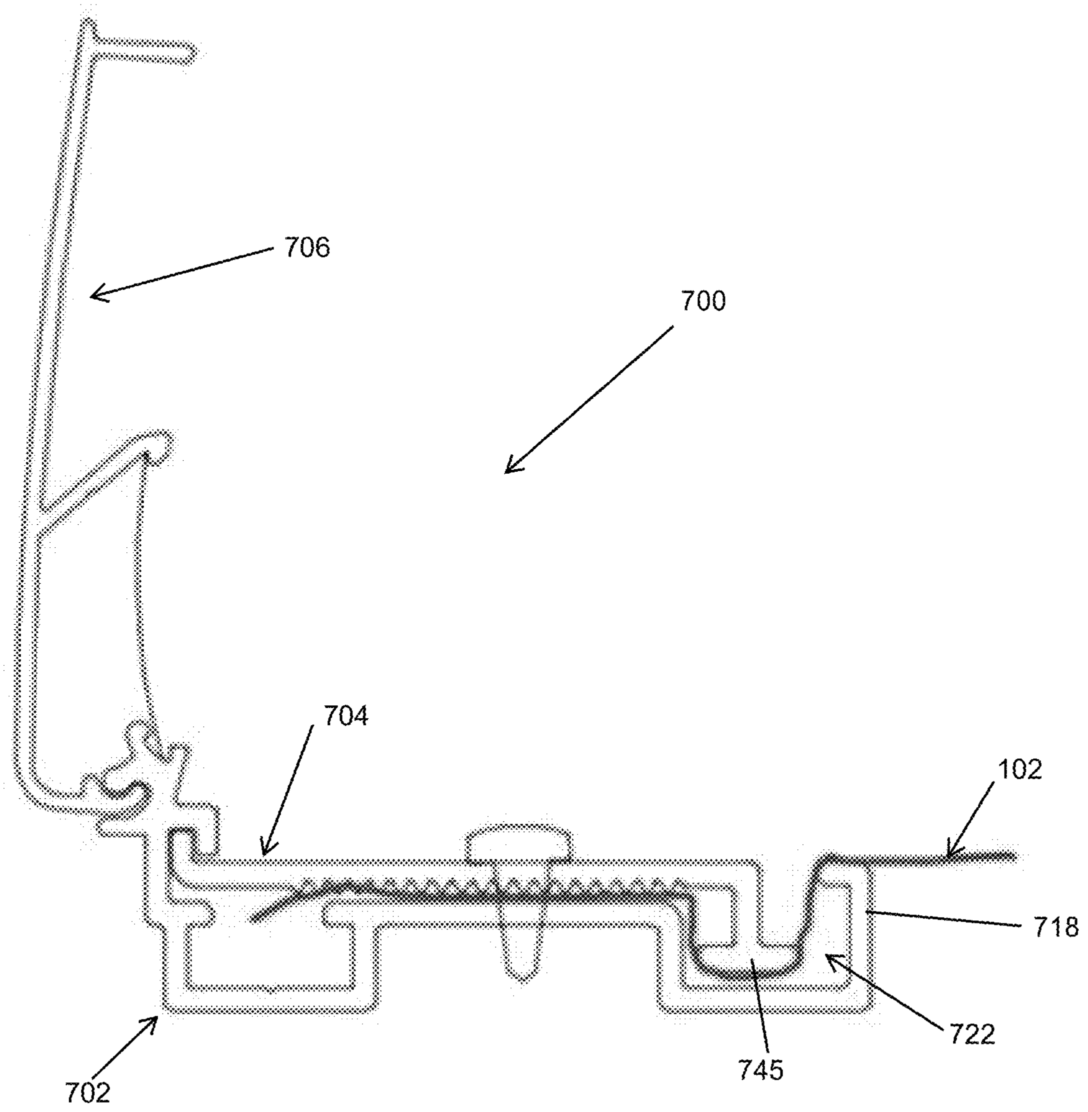
FIG. 12 is a cross sectional view of the third example mounting bracket of FIG. 11 made in accordance with the present disclosure.
Figure 13:
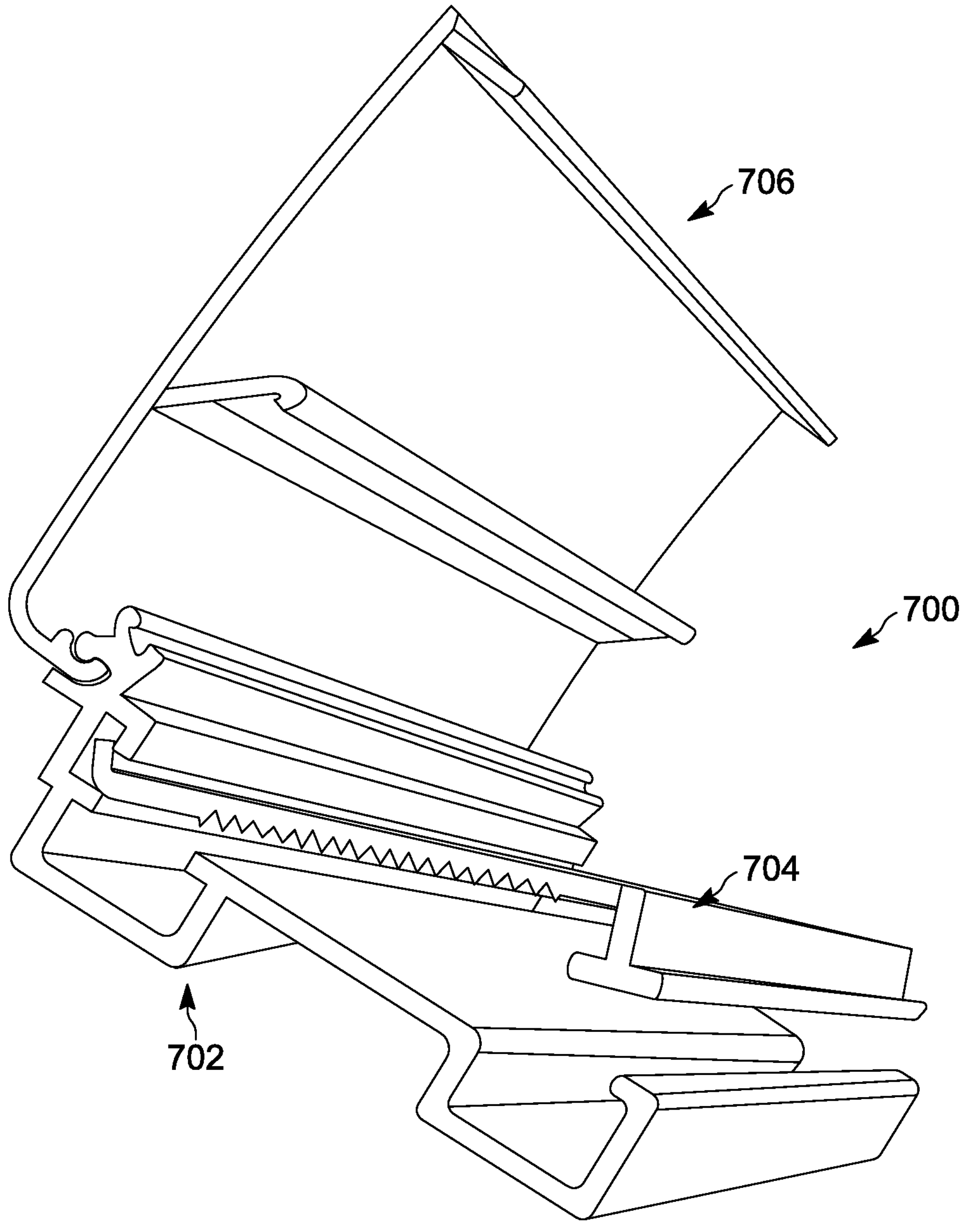
FIG. 13 is a perspective view of the third example mounting bracket of FIGS. 11 and 12 made in accordance with the present disclosure.

FIGS. 11-13 illustrate a cross-section of the third example mounting bracket assembly 700 with a base plate 702, a clamping arm 704, and a cover 706. The mounting bracket 700 in FIGS. 11-13 is identical, structurally and functionally, to the mounting bracket 600 in FIGS. 6-10 but for the clamping arm 704. Specifically, as seen in FIGS. 11-13, the clamping arm 704 of the mounting bracket assembly 700 includes a proximal end 742*a* and a distal end 742*b*. Like the assembly 600 in FIGS. 6-10, the distal end 742*b* of the clamping arm 704 includes a downwardly-extending stretch arm 744. But in FIGS. 11-13, the downwardly-extending stretch arm 744 includes a foot 745 disposed at a terminal end 744*a* thereof. In the disclosed version, the foot 745 includes a width dimension W that is larger than a thickness dimension T of the remainder of the downwardly-extending stretch arm 744. Moreover, in the disclosed version, the foot 744 includes an elongated planar structure disposed perpendicular to the remainder of the downwardly-extending stretch arm 744. So configured, when the downwardly-extending stretch arm 744 extends into a vertical channel 722 of the base plate 702, as shown in FIG. 12, the foot 745 is disposed in the vertical channel 722 and in contact with the banner 102. The foot 744 therefore provides for greater surface are for engaging the banner 102, as shown in FIG. 11, when the downwardly-extending stretch arm 744 extends into a vertical channel 722 of the base plate 702. That is, the banner 102 is stretched between the foot 745 and an upwardly-extending stretch arm 718 of the base plate 704, which is adjacent to the channel 722. In some versions, this configuration can advantageously push more banner material into the channel 722 for better stretching of the banner 102. While the foot 745 has been described as including a width dimension W that is larger than a thickness dimension T of the remainder of the downwardly-extending stretch arm 744 and as being a planar structure perpendicular to the remainder of the downwardly-extending stretch arm 744, other configurations and geometries are possible. In some examples, the foot may just include a longer downwardly-extending stretch arm 744 or a different shape of the downwardly-extending stretch arm 744 to achieve the same objective, i.e., more stretching of the banner 102.

Those skilled in the art will recognize that a wide variety of modifications, alterations, and combinations can be made with respect to the above described embodiments without departing from the spirit and scope of the invention(s) disclosed herein, and that such modifications, alterations, and combinations are to be viewed as being within the ambit of the inventive concept(s).

What is claimed is:

1. A mounting bracket assembly, comprising:

a base plate comprising a proximal end and a distal end, a first clamping surface disposed between the proximal and distal ends of the base plate, an upwardly-extending stretch arm at the distal end of the base plate, and a vertical channel disposed between the first clamping surface and the upwardly-extending stretch arm;

a clamping arm removably coupled to the base plate, the clamping arm comprises a proximal end and a distal end, a second clamping surface between the proximal and distal ends of the clamping arm, and a downwardly-extending stretch arm disposed at the distal end of the clamping arm, the downwardly-extending stretch arm configured to extend into the vertical channel of the base plate; and a cover configured to couple to the base plate over the clamping arm, wherein the downwardly-extending stretch arm comprises a foot disposed at a terminal end thereof, the foot configured to be disposed in the vertical channel of the base plate.

2. The mounting bracket assembly of claim 1, wherein the cover is coupled to the proximal end of the base plate and configured to move between an open position and a closed position relative to the base plate and clamping arm, the cover disposed over the clamping arm in the closed position.

3. The mounting bracket assembly of claim 1, wherein the base plate is one-piece, the clamping arm is one-piece, and/or the cover is one-piece.

4. The mounting bracket assembly of claim 1, further comprising a reusable adhesive disposed on the first clamping surface.

5. The mounting bracket assembly of claim 1, wherein the second clamping surface further comprises a gripping element.

6. The mounting bracket assembly of claim 5, wherein the gripping element comprises a plurality of teeth.

7. The mounting bracket assembly of claim 1, wherein the base plate includes a bottom surface, the first clamping surface being disposed above the bottom surface.

8. The mounting bracket assembly of claim 7, wherein an upper surface of the upwardly-extending stretch arm is higher than the first clamping surface.

9. The mounting bracket assembly of claim 1, wherein the cover moves about a pivot axis disposed on the proximal end of the base plate.

10. The mounting bracket assembly of claim 1, wherein the base plate further comprises a horizontal channel at the proximal end of the base plate, the horizontal channel configured to receive the proximal end of the clamping arm.

11. The mounting bracket assembly of claim 10, wherein the proximal end of the clamping arm engages a wall of the horizontal channel to define a fulcrum.

12. The mounting bracket assembly of claim 1, further comprising a fastener disposed through the clamping arm and first clamping surface of the base plate.

13. The mounting bracket assembly of claim of claim 12, wherein the cover is disposed over the fastener in the closed position.

14. A mounting bracket and banner tensioning system, comprising:

a first mounting bracket comprising:

a first base plate having a first clamping surface, a first upwardly extending stretch arm, and a first vertical channel disposed between the first clamping surface and the first upwardly-extending stretch arm;

a first clamping arm removably coupled to the first base plate, the first clamping arm having a first clamping arm clamping surface and a first downwardly extending stretch arm; and a first cover coupled to the first base plate;

a second mounting bracket, disposed opposite the first mounting bracket, comprising:

a second base plate having a second clamping surface, a second upwardly extending stretch arm, and a second vertical channel disposed between the second clamping surface and the second upwardly-extending stretch arm;

a second clamping arm removably coupled to the second base plate, the second clamping arm having a second clamping arm clamping surface and a second downwardly extending stretch arm; and a second cover coupled to the second base plate; and a banner including a first end secured between the first clamping surface and the first clamping arm clamping surface and a second end secured between the second clamping surface and the second clamping arm clamping surface, the banner stretched tight between the first mounting bracket and the second mounting bracket when the banner is stretched by the first downwardly extending stretch arm disposed in the first vertical channel and the second downwardly extending stretch arm disposed in the second vertical channel, wherein the first downwardly-extending stretch arm comprises a first foot disposed at a terminal end thereof, the first foot disposed in the first vertical channel of the first base plate and in contact with the banner when the banner is stretched by the first downwardly extending stretch arm, and wherein the second downwardly-extending stretch arm comprises a second foot disposed at a terminal end thereof, the second foot disposed in the second vertical channel of the second base plate and in contact with the banner when the banner is stretched by the second downwardly extending stretch arm.

15. The mounting bracket and banner tensioning system of claim 14, further comprising a reusable adhesive disposed on the first clamping surface and the second clamping surface.

16. The mounting bracket and banner tensioning system of claim 15, further comprising at least one first fastener fastening the first end of the banner to the first mounting bracket and at least one second fastener fastening the second end of the banner to the second mounting bracket.

17. The mounting bracket and banner tensioning system of claim 16, wherein the first cover is configured to couple to the first base plate over the at least one first fastener and the second cover is configured to couple to the second base plate over the at least one second fastener.

18. The mounting bracket and banner tensioning system of claim 14, wherein the banner is further stretched by extending the banner from the first downwardly extending stretch arm to the first upwardly extending stretch arm and extending the banner from the second downwardly extending stretch arm to the second upwardly extending stretch arm.

19. A method of displaying and tensioning a banner, comprising:

placing a first end of the banner on a first clamping surface of a first mounting bracket and a second end of the banner on a first clamping surface of a second mounting bracket, the first mounting bracket including a first base plate, a first clamping arm, and a first cover and the second mounting bracket including a second base plate, a second clamping arm, and a second cover;

securing the first end of the banner in the first mounting bracket and the second end of the banner in the second mounting bracket;

stretching the banner between the first base plate and first clamping arm and the second base plate and second clamping arm;

fastening the first clamping arm to the first base plate and the second clamping arm to the second base plate; and disposing the first cover over the first clamping arm and the second cover over the second clamping arm, wherein stretching the banner between the first base plate and the first clamping arm includes stretching the banner between a downwardly-extending stretch arm disposed on the first clamping arm and an upwardly-extending stretch arm disposed on the first base plate, and wherein stretching the banner between the downwardly-extending stretch arm disposed on the first clamping arm and the upwardly-extending stretch arm disposed on the first base plate comprises stretching the banner between a foot disposed at a terminal end of the downwardly-extending stretch arm and the upwardly-extending stretch arm.

20. The method of claim 19, wherein fastening the first clamping arm to the first base plate includes fastening a screw through the first clamping arm and the first base plate.

21. The method of claim 19, further comprising disposing the first mounting bracket opposite the second mounting bracket.

* * * * *